US006508498B1

(12) United States Patent
Spether

(10) Patent No.: US 6,508,498 B1
(45) Date of Patent: Jan. 21, 2003

(54) HOLDING DEVICE FOR HOLDING A CONTAINER AND A METHOD FOR FIXING A CONTAINER

(75) Inventor: Karl-Heinz Spether, Ladenburg (DE)

(73) Assignee: Alcoa Deutschland GmbH Verpackungswerke (DE)

( * ) Notice: Subject to any disclaimer, the term of this patent is extended or adjusted under 35 U.S.C. 154(b) by 0 days.

(21) Appl. No.: 09/869,670

(22) PCT Filed: Dec. 22, 1999

(86) PCT No.: PCT/EP99/10261

§ 371 (c)(1), (2), (4) Date: Oct. 2, 2001

(87) PCT Pub. No.: WO00/38994

PCT Pub. Date: Jul. 6, 2000

(30) Foreign Application Priority Data

Dec. 29, 1998 (DE) ........................................ 198 59 963

(51) Int. Cl.[7] .......................... B25J 15/08; B65G 47/00

(52) U.S. Cl. .................... 294/116; 294/115; 198/803.9; 198/803.14

(58) Field of Search ................................ 294/115, 116; 198/803.3, 803.9, 803.14; 414/751.1, 753.1

(56) References Cited

U.S. PATENT DOCUMENTS 3,608,744 A 9/1971 Ward ....................... 214/1 BC
3,612,254 A 10/1971 Wideman ................... 198/179
3,868,010 A * 2/1975 Banyas et al. .............. 198/500
4,034,542 A * 7/1977 Loehr ......................... 294/116
4,116,325 A * 9/1978 McDonald ............. 198/377.07
4,280,612 A 7/1981 Nagano
4,593,948 A * 6/1986 Borcea et al. .............. 294/106
4,845,834 A * 7/1989 Watson ....................... 294/116
5,259,913 A 11/1993 Stover
5,383,697 A * 1/1995 Roudaut ..................... 294/115
5,398,485 A * 3/1995 Osifchin ................ 198/803.14

FOREIGN PATENT DOCUMENTS

DE 2740220 3/1979
FR 2482575 11/1981

* cited by examiner

*Primary Examiner*—Dean J. Kramer
(74) *Attorney, Agent, or Firm*—Ostrolenk, Faber, Gerb & Soffen, LLP

(57) ABSTRACT

A holding apparatus for a container and a method of holding a container of any size or shape, and formed of any material by supporting a container on a holding plate and employing a gripping mechanism to apply a frictional clamping force to the container. A displacement mechanism including a slider is magnetically coupled to the holding plate. The slider is operable to move the holding plate, to release the holding plate at a predetermined location, and by further movement of the slider after the holding plate has been released at the predetermined location, to displace the gripping mechanism to a clamping state in which frictional clamping forces are applied to the container. The method involves the steps of positioning a container on the holding plate while the holding plate is at an initial position, displacing the holding plate carrying the container thereon from the initial position to a clamping position by the movement of a displacement mechanism that is detachably coupled to the holding plate, detaching the holding plate from the displacement mechanism at the clamping position; and thereafter, operating the gripping mechanism to apply frictional clamping forces to secure the container in place on the holding plate.

27 Claims, 1 Drawing Sheet

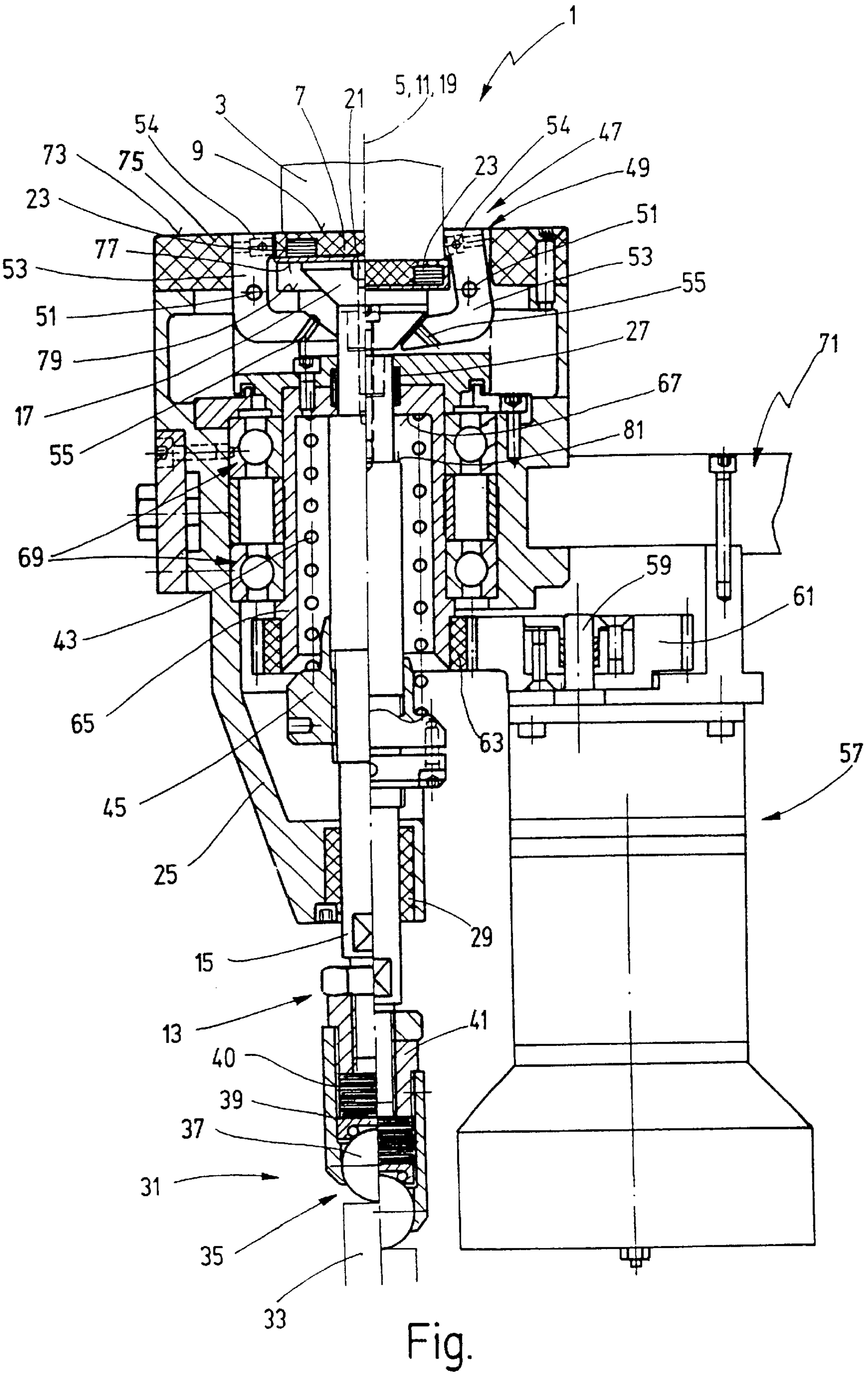
Fig.

HOLDING DEVICE FOR HOLDING A CONTAINER AND A METHOD FOR FIXING A CONTAINER

The invention relates to a holding device for holding a container, in particular a can or a bottle, and to a method for securing a container, in particular a can or a bottle, during processing.

A holding device of the type mentioned is known from FR-A-2 482 575. It is used to hold a container embodied as a bottle, in such a way that a cap can be fitted on said container. With this device, bottles which are conveyed on a belt are clamped between two jaws and thus secured so that the caps can be fitted on. The jaws have indents at intervals corresponding to the distance between the bottles on the belt. The precision with which the bottles can be secured by this device depends therefore on how uniform the distance is between them when they are conveyed on the belt.

The object of the invention is to disclose a device for holding a container and a method for securing a container which ensure that the container is secured in a reproducible and functionally reliable manner.

In order to achieve this object, a device having the features of claim 1 is proposed.

In order to achieve this object, a device according to the invention includes a gripping apparatus which can be used to secure the container in a frictionally locking manner. Owing to this design, the holding device can be used universally, that is to say the holding device can be used to clamp or fix a wide variety of containers, for example cans or bottles, and the bottles here can be manufactured from glass, plastic or metal, for example steel or aluminum. The holding device is defined by a high level of functional reliability.

In the context of the invention in question here, the term "holding" is to be understood in the sense of "hold in position". A container of virtually any desired design can therefore be positioned and/or laid on the holding device. Of course, it is also possible for the holding device to be embodied in such a way that the container can be introduced partially or essentially completely into the holding device. In one preferred embodiment, there is provision for the container to be able to be introduced at least partially, preferably by its end region which has the base, into the holding device, or to be arranged therein. It is common to all the embodiment variants that the container can be securely held by means of the gripping apparatus in a frictionally locking manner irrespective of its position with regard to the holding device or its shape or the material from which it is composed.

An exemplary embodiment of the holding device is preferred which is defined by the fact that the gripping apparatus comprises a plurality of gripping elements, preferably at least three. The arrangement of the preferably finger-shaped or hook-shaped gripping elements and their design is selected in a preferred embodiment in such a way that the container which is to be fixed or held in position can be introduced into the intermediate space between the gripping elements which are arranged distributed over the circumference of an imaginary circle. When the displaceable gripping elements are activated, they bear against the outer circumference of the container, enabling the container to be centered. The number of gripping elements is in the region of 2 to 20, preferably 2 to 8, and the number of gripping elements used is preferably such that the container can be centered. Of course, it is also possible for the gripping apparatus to have just a single gripping element which interacts with at least one opposing element in such a way that the container can be secured between the opposing element and the gripping element. In this exemplary embodiment, it is possible, for example with an appropriate design of these parts, to center the container by, in particular, displacing the opposing element and/or the gripping element.

Furthermore, an exemplary embodiment of the holding device is preferred in which the gripping apparatus is associated with a holding plate for the container, on which holding plate the container can preferably be centered using the gripping apparatus. Moreover, a displacement apparatus and/or a drive apparatus for the holding plate is provided which can be used to displace the holding plate, with the container which can be arranged on it, in the direction of the longitudinal center axis of said holding plate, or to rotate said holding plate about its longitudinal center axis. The drive device can be used to orient the container with respect to, for example, a treatment device for cleaning, filling, emptying, printing on, opening and/or closing the container, and the rotational orientation can be carried out before, after or during the operation in which the container is secured by the gripping apparatus.

According to one development of the invention there is provision for the displacement apparatus to comprise a slide which preferably has a slide head which interacts with the holding plate, it being possible to connect the slide or the slide head to the holding plate in a detachable fashion. According to one embodiment variant, the gripping elements of the gripping apparatus can be coupled by the slide, in particular the slide head, in such a way that the gripping elements are displaced, preferably pivoted, out of a position of rest into a clamping position. The slide therefore has a double function because it is used, on the one hand, to displace the holding plate and, on the other hand, to activate the gripping elements. Owing to this design, a holding device with a simple structure can be implemented.

Finally, an exemplary embodiment of the holding device is preferred in which the holding plate and the slide are separated from one another before the gripping elements are displaced into their clamping position by displacing the slide. The displacement movement of the holding plate and that of the gripping elements therefore take place separately from one another, the holding plate with the container located on it being displaced first before the container is clamped tight on the holding plate.

Further advantageous embodiments of the holding device emerge from the other subclaims.

In order to achieve the object, a method according to the invention includes the steps of first placing a container on a displaceable holding plate, then displacing the holding plate, together with the container, out of a standby position (home position) into a fixing position (clamping position) in which the container is secured in a frictionally locking manner by means of a gripping apparatus with at least one gripping element, preferably a plurality of gripping elements. The clamping tight of the container in order to secure it is carried out using the gripping elements only after the holding plate has reached its fixing position. The displacement movement of the holding plate and that of the gripping elements therefore take place separately from one another, as a result of which the container can be clamped or fixed in a defined, reproducible fashion.

In one particularly preferred exemplary embodiment, just a single open-loop or closed-loop control element is used to displace the holding plate and to activate the gripping element. Owing to the clamping tight of the container on the holding plate, a wide variety of containers, for example aluminum cans, steel cans, glass bottles or other containers which are also composed of plastic can be securely held.

Further advantages and features of the invention will be apparent from the following description.

With reference to the single FIGURE which shows a longitudinal section through a device according to the invention. As illustrated, the device, generally denoted as 1, holds a container 3, for example a can which is composed of aluminum or steel, or a bottle which is composed of glass or plastic. A number of parts of the holding device 1 are embodied so as to be displaceable in the direction of an axis 5 of symmetry which extends essentially vertically here, the half of these parts which is illustrated to the left of the axis 5 of symmetry being located in a first functional (home position) and the half which is illustrated to the right of the axis 5 of symmetry being located in a second functional position (clamping position).

The holding device 1 comprises a disk-shaped holding plate 7 on whose upper side 9 the container 3 is placed, that is to say the base of the container 3 rests on the upper side 9 of the holding plate 7. In this exemplary embodiment, the longitudinal center axis 11 of the holding plate 7 which has a circular or essentially circular cross section and the axis 5 of symmetry are arranged aligned with one another. The term "longitudinal center axis" is understood here as the axis which extends in the longitudinal direction and through the center of the cylindrical holding plate 7—viewed in cross section—and about which the holding plate 7 can be rotated; further details of this will be given below.

The holding plate 7 can be displaced in the direction of its longitudinal center axis 11, that is to say the holding plate 7 can be raised or lowered in a vertical direction in accordance with the illustration in the figure, by means of a displacement apparatus 13. The displacement apparatus 13 comprises here a slide 15 which is also referred to as a plunger, has a rod-shaped base element and a truncated cone-shaped slide head 17 which interacts with the holding plate 7. The longitudinal center axis 19 of the slide 15 is aligned here with the axis 5 of symmetry, or the longitudinal center axis 11 of the holding plate 7. The large diameter of the conical slide head 17 faces the holding plate 7.

The slide head 17, which is detachably attached to the slide 15 by means of attachment means 21 which are formed by screws here, and the holding plate 7 can be connected to one another by means of magnetic forces. For this purpose, in this exemplary embodiment a plurality of magnet elements 23 are integrated, for example cast, into the holding plate 7. Furthermore, the slide head 17 forms the opposite pole which is composed of a magnetic or magnetizable material, or has at least one element which is magnetic or magnetizable.

In order to mount the slide 15 arranged within a housing 25 of the holding device 1 in a rotatable and longitudinally displaceable manner, a first bearing 27 and a second bearing 29 are provided which are each formed by a bush, preferably a slide bush. The first bearing 27 is arranged at a relatively small distance from the slide head 17.

In the exemplary embodiment of the holding device 1 illustrated in the figure, a cam control 31 is provided for controlling the displacement movement of the slide 15, said cam control 31 comprising a moveable, for example rotatable contour plate 33 whose circumference has a cam-shaped profile. Only a portion of the contour plate 33 is illustrated in the figure. The structure and the function of a cam control is known per se so that it does not need to be described in more detail.

The contour plate 33 is sensed by a sensing element 35 of the slide 15 which is provided on the end of the slide 15 facing away from the slide head 17. The sensing element 35 is formed here by a sphere 37 which slides on the contour plate 33 and is held in a sleeve 39 with an internal thread, in such a way that a spherical section projects out of the sleeve and the sphere bears with said spherical section against the contour plate. The sleeve 39 is screwed onto a sleeve-shaped adapter 41 which is in turn screwed onto a section of the slide 15 which is provided with an external thread. In order to prevent the sensing element 35 or the sphere 37 from lifting off from the contour plate 33, for example at high displacement speeds, the sphere 37 is pressed in the direction of the contour plate 33 by means of a spring element 40 which is formed by a compression spring and is provided in the interior of the sleeve 39, as a result of which the sphere is pressed in a sprung fashion against the contour plate 33. In the mounted state of the sensing element 35, the sphere 37 is therefore subjected to a pressing force so that it is, as it were, pressed out of the sleeve 39. The force which is applied to the sphere by means of the spring element 40 is adjustable by screwing the sleeve 39 onto the adapter 41 to a greater or lesser extent.

So that the slide 15 is not pressed solely by its own weight toward, or in the direction of, the contour plate 33, in this exemplary embodiment a spring element 43 formed here by a compression spring is provided, which spring element 43 interacts with an adjustment nut 45 which can be screwed onto a longitudinal section of the slide 15 provided with an external thread. In order to adjust the force with which the slide 15 is displaced in the direction of its longitudinal center axis and in the direction of the contour plate 33, it is possible, for example, to exchange the spring element 43 and/or to change the position of the adjustment nut 45 in the longitudinal direction of the slide. In the exemplary embodiment illustrated in the figure, the greater the distance between the adjustment nut 45 and the slide head 17, the smaller the force which, in the figure, presses the slide downward, and the smaller the distance between the adjustment nut 45 and the slide head 17, the greater the force acting on the slide 15 in the direction of its longitudinal center axis. As a holding apparatus, described below, for the container is manipulated in a desired fashion by means of the slide 15 or the slide head 17, the spring element 43 and the adjustment nut 45 are also used to adjust the clamping force with which a container arranged on the holding plate can be secured in a frictionally locking manner, and further details of this will be given below.

The holding device 1 also comprises a holding apparatus 47 which is formed here by a gripping apparatus 49 which is assigned to the holding plate 7. The gripping apparatus 49 comprises a plurality of gripping elementss 53 which can pivot about an axis 51 which extends transversely with respect to the longitudinal center axis 11 of the holding plate 7, and of which only two gripping elements 53 can be seen in the figure. The gripping elements 53 which are of essentially L-shaped design and are also referred to as gripping fingers are arranged distributed at a distance from one another over the circumference of an imaginary circle. In one advantageous exemplary embodiment, the gripping apparatus has three gripping elements which are arranged over the circumference of an imaginary circle at intervals of 120°. The distance between one gripping element and an adjacent gripping element is preferably always the same, or essentially always the same, in all the exemplary embodiments.

As is clear from the FIGURE, the holding plate 7 is arranged between the gripping elements 53. The gripping elements 53 are used to secure a container standing on the upper side 9 of the holding plate 7 on the holding plate 7 in such a way that said container cannot be rotated or displaced with respect to the holding plate. In the exemplary embodiment in which at least three gripping elements 53 are provided, it is possible to ensure that when the gripping elements 53 pivot about their axes 51 the container 3 is secured on the holding plate 7 in a frictionally locking fashion and centered at the same time. The pivoting of the gripping elements 53 is brought about by the fact that, when an appropriately shaped section of the contour plate 33 is reached, the slide 15 which senses the contour of the contour plate 33 with its sensing element 35 is displaced downward, that is to say is pressed by the spring element 43 which interacts with the adjustment nut 45, as a result of which the conical slide head 17 is moved so that its outer surface comes to bear against pressure elements 55 of the gripping elements 53. Given further lowering of the slide 15, the gripping elements 53 are coupled by the slide head 17 in such a way that said slide 15 is displaced, that is to say pivoted, out of its position of rest (slide 15 illustrated to the left of the axis 5 of symmetry) into a clamping position (slide 15 illustrated to the right of the axis 5 of symmetry). In the process, the end regions of the Lshaped gripping elements approach the center of the imaginary circle, as a result of which the container is fixed between the gripping elements. In order to avoid the container 3 being damaged, the gripping elements 53 are provided in their end region, which can be moved so as to bear against the container arranged on the holding plate, with preferably exchangeable clamping elements 54 which are composed, for example, of rubber.

The pressure elements 55 which are integrated into the gripping elements 53 have the purpose of compensating tolerances, for example fabrication and position tolerances. As a result it is possible to ensure that when the gripping apparatus 49 is activated, the container 3 is held between all the gripping elements of the gripping apparatus in a frictionally locking manner even if the tolerances are large and/or if the container is not centered by the gripping elements themselves when there is an eccentric arrangement of the container on the holding plate and an even number of gripping elements, for example four gripping elements.

The holding plate 7, the slide 15 and the gripping apparatus 49, or the gripping elements 53, can be driven by means of a drive apparatus 57 so that they turn about the axis 5 of symmetry, the longitudinal center axis 11 or the longitudinal center axis 19. The drive apparatus 57 comprises a motor, preferably an electric motor, which can be used to apply a torque to an output journal 59 directly or via a gear mechanism. A first gearwheel 6 which is connected and fixed in terms of rotation to the output journal 59 and has an outer toothing intermeshes with a second gearwheel 63 which also has an outer toothing and is fitted onto a sleeve-shaped transmission element 65 and connected fixed in terms of rotation thereto. Arranged in the interior of the transmission element 65 is the spring element 43 which is supported on an annular shoulder 67 of the transmission element 65 in order to apply a force in the direction of the sensing element 35 to the adjustment nut 45 screwed onto the slide 15, with the result that the slide is pressed in the direction of the contour plate 33. The transmission element 65 is held inside the housing 25 by means of two bearings 69, which are formed by ball bearings here, so as to be rotatable about the axis 5 of symmetry or the longitudinal center axes 11, 19, and so as to be incapable of being displaced in the direction of these taxes. The slide 15 engages through a passage in the transmission element 65.

As is clear from the figure, the holding device 1 and the drive apparatus 57 are provided on a guide unit 71 which can be used to displace the holding device 1 along a guide path, for example from a first processing station to a second processing station of a machine for filling, emptying, cleaning, printing on and/or sealing the container or performing some similar operation on it. In one processing station and/or during the displacement along the guide path, the container 3, which stands on the holding plate 7 and is held by the gripping elements 53 in a frictionally locking manner, is therefore, for example, filled with a gas and/or a liquid and sealed with a lid in the next processing station. The structure and function of such a guide unit, which is also referred to as a processing star, is known so that a more detailed description will not be given.

The function of the holding device 1 will be explained in more detail below by reference to a fixing process. In the home position of the holding plate 7, its upper side 9 is arranged flush with the upper side 73 of a cover plate 75 which is detachably connected to the base element 25 and in whose central region a recess is provided in which the holding plate 7 is located. In the home position, the holding plate 7 and the slide head 17 are connected to one another by means of magnetic forces.

After a container has been placed on the holding plate 7, a vertical downward displacement of the slide 15 causes the slide head 17, and thus also the holding plate 7 to be lowered, for example by a distance of 8 mm, until the holding plate 7 moves with its underside 77 against a stop 79 and is as a result stopped. Up to that point, that is to say until this time, the gripping apparatus 49 is still relatively inactive, that is to say the gripping elements 53 have not yet clamped tight the container 3 standing on the holding plate 7.

After the holding plate 7 has moved against the stop 79 and then rests on it, the holding plate 7 and the slide head 17 are separated from one another in that the slide head 17 is lowered further. As a result, the gripping arms 53 are subsequently pivoted by the slide head 17 to such an extent that the container 3 located on the holding plate 7 is secured in a frictionally locking manner.

By means of the drive apparatus 57, the container 3 which is held clamped on the holding plate 7 can be oriented in a desired fashion with respect to a processing station, for example a filling station for the container, by simultaneously rotating the holding plate and the gripping apparatus.

As is clear from the figure, the slide 15 has an annular collar 81 which strikes against the annular shoulder 67 of the transmission element 65 when the slide 15 is raised. The annular shoulder 67 therefore forms a stop for the slide 15. The distance between the annular collar 81 and the upper side 9 of the holding plate 7 is a fixed dimension and therefore has only very small tolerances. As a result of the distance it is possible to determine precisely whether the upper edge of the slide head 17 projects beyond the upper side 73 of the cover plate 75, is flush with the upper side 73 or is even countersunk in the cover plate 75 when the slide 15 is in the position in which it is raised to the maximum extent, in which position the holding plate is preferably in its home position. The embodiment variant illustrated in the figure is particularly preferred, the upper side 9 of the slide head 17 and the upper side 73 of the cover plate 75 being arranged in said embodiment in an imaginary plane, extending horizontally here, when the annular collar 81 bears against the annular shoulder 67 so that when a container is placed on the holding plate 7 no disruptive steps are formed which could cause the container to tilt and/or be displaced.

It should also be noted that the clamping force with which a container can be held by the gripping elements which are of pivotable design here can be adjusted using the adjusting nut 45. In the exemplary embodiment illustrated in the figure, the more the spring element 43 which is supported on the annular shoulder 67 of the transmission element 65 is compressed, the greater the clamping forces. If a container is held only with small forces, the spring element 43 can be relieved of loading in the manner described above by correspondingly changing the position of the adjustment nut in the longitudinal direction of the slide.

The abovementioned method is readily apparent from the description of the figure. Of course, in order to secure a container by means of a gripping apparatus which has at least one gripping element, preferably a plurality of gripping elements and is assigned to a displaceable holding plate of the container, the container is firstly placed on the holding plate. The holding plate is then displaced from its home position into a fixing/clamping position. Subsequently, that is to say after the holding plate is already in the fixing position, it is secured in a frictionally locking manner by means of the gripping elements. Owing to the advantageous separation of the displacement movement of the holding plate and that of the gripping elements it is possible to ensure that the container is secured in a reproducible, functionally reliable fashion. It becomes readily apparent that the holding device 1 can be used as an antitwist protection and/or as an orientation apparatus for any desired containers.

In one exemplary embodiment of the holding device in which the slide, in particular the slide head and the holding plate can be connected to one another by means of magnetic forces, the magnet elements are not provided in the holding plate but rather in the slide head. Accordingly, the holding plate forms the magnetic or magnetizable opposite pole or has elements which are magnetic or magnetizable.

In the exemplary embodiment of the holding device 1 described with reference to the figure it is particularly advantageous that the displacement movement (lowering/raising) of the holding plate and that of the gripping elements (pivoting) is carried out by means of a common activation element which is formed here by the slide 15. As a result, a simple structure of the holding device can be realized. It is also advantageous that the slide is separated from the holding plate after the latter has been lowered into the clamping position, and that the slide is used for pivoting the gripping elements only after this.

From all the above it becomes clear that the gripping apparatus can also be embodied in such a way that the at least one gripping element is not pivoted but rather displaced, that is to say carries out a translatory movement along a straight line in order to secure the container in a frictionally locking manner. The design of the gripping elements is preferably selected such that the container is centered when it is fixed.

What is claimed is:

1. A holding device for a container including:

a holding apparatus comprised of a holding plate and a gripping mechanism operable to apply a frictional clamping force to a container on the holding plate;

a displacement mechanism operable to move the holding plate, the displacement mechanism being comprised of a slider and a slide head coupled to the slider which interacts with the holding plate; and a cam mechanism that controls displacement of the slider, the cam mechanism being comprised of a contour plate having a cam surface thereon, and a sensing element on the slide head that engages with the cam surface.

2. A holding device for a container including:

a holding apparatus comprised of a holding plate and a gripping mechanism operable to apply a frictional clamping force to a container on the holding plate; and a displacement mechanism operable to move the holding plate, the displacement mechanism being comprised of a slider and a slide head, the slide head being releasably connectable to the holding plate by magnetic forces.

3. The holding device as claimed in claim 2, wherein the magnetic forces are brought about by magnet elements in the holding plate which interact with an opposite magnetic pole which is arranged on the side of the slide the slide head.

4. The holding device as claimed in claim 2, wherein the magnetic forces are brought about by magnet elements in the slide head which interact with an opposite magnetic pole which is arranged on the side the holding plate.

5. A holding device for a container including:

a holding apparatus comprised of a holding plate and a gripping mechanism operable to apply a frictional clamping force to a container on the holding plate;

a displacement mechanism including a slider releasably coupled to the holding plate, the slider being operable:

to move the holding plate;

to release the holding plate at a predetermined location; and by further movement of the slider after the holding plate has been released at the predetermined location, to displace the gripping mechanism to a clamping state in which frictional clamping forces are applied to a container on the holding plate.

6. The holding device as claimed in claim 5, wherein the holding plate and the gripping mechanism are rotatable about the longitudinal center axis of the holding plate by means of a drive apparatus.

7. The holding device as claimed in claim 5, wherein the holding plate is retractable into the holding device.

8. The holding device as claimed in claim 5, wherein the displacement mechanism further comprises a slide head which interacts with the holding plate.

9. The holding device as claimed in claim 5, wherein:

the gripping mechanism includes a plurality of gripping elements; and the further movement of the slider is operative to pivot each of the gripping elements from a standby position to a clamping position.

10. The holding device as claimed in claim 5, further including a guide unit which supports the holding device for rotation about an axis.

11. The holding device as claimed in claim 5, wherein the frictional clamping forces are provided by adjustable contact pressure applied against the container by the gripping mechanism.

12. The holding device as claimed in claim 5, wherein the gripping mechanism further includes a compensation mechanism operative to compensate for out-of-tolerance conditions.

13. A method for securing a container in a holding device comprised of a displacable holding plate and a gripping mechanism, the method comprising the steps of:

positioning a container on the holding plate while the holding plate is at an initial position;

displacing the holding plate with the container thereon from the initial position to a clamping position by the movement of a displacement mechanism that is detachably coupled to the holding plate;

detaching the holding plate from the displacement mechanism at the clamping position; and thereafter, operating the gripping mechanism to apply frictional clamping forces to secure the container in place on the holding plate.

14. The method as claimed in claim 13, wherein:

the gripping mechanism includes a plurality of gripping elements; and the frictional clamping forces are applied by the gripping elements at uniformly spaced positions around the periphery of a container on the holding plate.

15. The method as claimed in claim 13, wherein the gripping mechanism is operated by further movement of the displacement mechanism after the holding plate has been released at the clamping position.

16. The method as claimed in claim 15, wherein the gripping mechanism includes a plurality of elements that are pivotable by the further movement of the displacement mechanism to apply the frictional clamping forces.

17. The method as claimed in claim 13, wherein:

the gripping mechanism includes a plurality of gripping elements; and the frictional clamping forces are so applied by the gripping elements that the container is centered on the holding plate.

18. The method as claimed in claim 13, wherein the frictional clamping forces are provided by adjustable contact pressure applied against the container by the gripping mechanism.

19. A holding device for a container including:

a holder that receives a container therein;

a clamping mechanism for a container in the holder, the clamping mechanism being comprised of a gripping mechanism that applies a frictional clamping force to a container in the holder; and a displacement mechanism that releasably carries the holder, and is axially movable in a first and a second direction relative to a container in the holder, the displacement mechanism being operative, when moving in the first direction:

to transport the holder between a first position at which the gripping mechanism is operated so that frictional clamping force is not applied to a container in the holder, and a second position at which the holder is disengaged from the displacement mechanism and maintained;

to operate the gripping mechanism after disengaging from the holder at the second position to apply frictional clamping force to a container in the holder, the displacement mechanism being operative, when moving in the second direction:

to operate the gripping mechanism to remove frictional clamping force applied to a container in the holder, and thereafter, to engage the holder at the second position and move it to the first position.

20. A holding device as claimed in claim 19, wherein the displacement mechanism is comprised of a slider and a slide head that releasably carries the holder and operates the gripping mechanism.

21. The holding device as claimed in claim 20, further including a stop mechanism which engages the holder at the second position and releases it from the slide head.

22. The holding device as claimed in claim 20, wherein the holder and the slide head are connected together by magnetic forces.

23. The holding device as claimed in claim 20, further including a cam mechanism for operating the slider to move the slide head in the first and second directions.

24. The holding device as claimed in claim 20, wherein the gripping mechanism includes a plurality of gripping elements that are pivotally movable by the slide head to apply the frictional clamping force.

25. The holding device as claimed in claim 19, further including a stop mechanism which engages the holder at the second position and releases it from the displacement mechanism.

26. The holding device as claimed in claim 19, wherein the frictional clamping forces are provided by adjustable contact pressure applied against the container by the gripping mechanism.

27. The holding device as claimed in claim 19, wherein the gripping mechanism further includes a compensation mechanism operative to compensate for out-of-tolerance condition.

* * * * *